318-135 CROSS REFE SEARCH ROO

Feb. 8, 1966 G. C. DEVOL 3,233,749

MICROMANIPULATORS

Filed May 20, 1963 2 Sheets-Sheet 1

INVENTOR.
George C. Devol

BY Paul S. Martin

ATTORNEY

INVENTOR.
*George C. Devol*

BY *Paul S. Martin*

ATTORNEY

United States Patent Office 3,233,749
Patented Feb. 8, 1966

3,233,749
MICROMANIPULATORS

George C. Devol, Brookside Drive, Greenwich, Conn.
Filed May 20, 1963, Ser. No. 281,667
17 Claims. (Cl. 214—1)

The present invention relates to micromanipulators, for moving a work element through extremely small distances. The work element may be an index pointer in a measuring device, or a tool or a work holder, or the micromanipulator may be used as an adjustment in a wide variety of apparatus where it may prove suitable.

An object of this invention is to provide a novel, precisely controllable and reproduceable micromanipulator. This broad purpose is carried out by means of a series of physically interconnected components whose physical dimensions can be changed selectively by either the piezoelectric or the magnetostrictive effect. The components can be related to produce certain predetermined combinations of motions when excitation is imposed. Thus, four of these components may be arranged to produce "units" motion; one may produce "5 units" motion, two more may each produce "10 units" motion, and so on, all arranged in series and related to each other as the values of certain decimal coin systems. They may alternatively be arranged to provide increments of motions that may be added together by direct physical interconnection, according to other systems, the binary system being used in the illustrative embodiments of the invention described below. By employing standardized electric sources of excitation for the fields required, and coordinated selective controls for determining the combinations of components to be excited, precise predetermined motions can be produced directly and without need for verification.

A further object of the invention resides in providing novel apparatus for producing a predetermined series of micro-motions accurately and reproduceably. This aspect of the invention is accomplished through provision of coordinated selective controls for the various dimensionally changeable components. In one case this control may be manual, and may effect a regular progression of motions. In another, a program of arbitrarily related motions may be performed under the control of punch-card, magnetic-memory or other programming apparatus.

Further objects of the invention involve achievement of a sequence of motions, where the increments and the total range of motion are susceptible of proportional adjustment, to meet different conditions. This is accomplished by using field-controlled components within a range of excitation where their stroke is a function of the imposed field. With a set level of excitation, one set of motions of the individual components and of the series of components is carried out. With a different level of excitation, another set of motions is produced proportionally changed from those of the first level of excitation.

A related object of the invention resides in providing a micromanipulator of the foregoing character whose motions can be reproduceably controlled without dependence on the field-versus-deflection characteristics of the components or on the precise level of excitation used. This is achieved through selective application of saturating excitation on the components, made of materials having a saturating characteristic.

Further features of the invention relate to provision of specific forms of components useful in the foregoing aspects of the invention, for increasing the amounts of motion available from a field-responsive component; with provision of temperature compensation of the apparatus both for ambient conditions and for conditions resulting from the excitation itself; and to achieving relatively smooth changes in the total displacement of a series of components as the selected combination of components that are energized is changed.

The nature of the invention will be better appreciated, and the foregoing and other objects, features and advantages will be better understood, from consideration of the detailed description of various forms of apparatus that illustrate, by way of example, the novel features of the invention. These forms are shown in the accompanying drawings which form a part of the present disclosure and which are referred to in the detailed description below. In the drawings.

Figure 1:
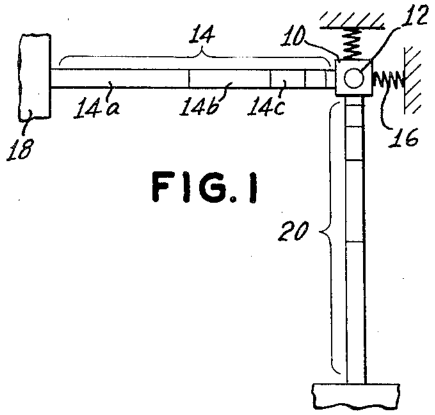
FIGURE 1 is a diagrammatic plan view of a micromanipulator embodying features of the invention.

In the drawings, FIG. 1 shows a work-supporting table 10 that is to be moved in horizontal and vertical directions (as viewed in the drawing) by microscopic distances that can be precisely controlled and, as will appear below, that can be moved through programmed strokes. For some time there has been a growing need for such micromanipulator in the fabrication of microminiature apparatus. Thus, table 10 may support and accurately move an article in a series of accurately related positions relative to an electron-beam machining tool, an optical scribing tool, for indenting, engraving, inspecting and measuring, etc., such apparatus 12 being disposed above the work table 10 in FIG. 1.

A column 14 of elements **14*a*, 14*b*, 14*c*, etc., bears against the left side of table 10, and compression spring 16 holds the table against column 14 at all times. Remote from spring 16 is a stop or reference point 18 against which column 14 reacts. Elements 14*a*, 14*b*, etc., represent magnetostrictive cores or piezoelectric elements capable of accurately reproduceable and fast response to imposed fields, magnetic or electrostatic, respectively. In FIG. 1, element 14*a* may be a magnetostrictive core that is twice as long as element 14*b*, which is twice as long as element 14*c*, and so on to the end of the series, where all the elements are of the same material. With five elements shown, there are thirty-two possible positions that can be selected for shifting table 10 to the left or right within the toal range of motion. The magnitude of the total range is dependent on the total length of column 14**, on the material used, and on the field-imposing excitation. Assuming a given material and a standardized excitation is available, then the range of motion is a function of the total length. If a greater number of possible positions in this range than thirty-two are desired, then the elements are to be subdivided into a correspondingly larger number, each additional element doubling the total number of positions in the range that may be selected by selectively exciting (or not exciting) the various elements.

Horizontal movement of table 10 to a range of positions at right angles to that produced by column 14 is achieved by a like column 20 of elements. In both cases, either the elements are in direct abutment with each other (apart from inert spacers that may be interposed for field isolation) or they are united. In both cases the dimensional changes of the material of elements results from the imposed exciting field, whether electrostatic or magnetic. The motions thus made possible are precisely controllable and are of the very low orders of magnitude needed in micromanipulators.

Figure 2:
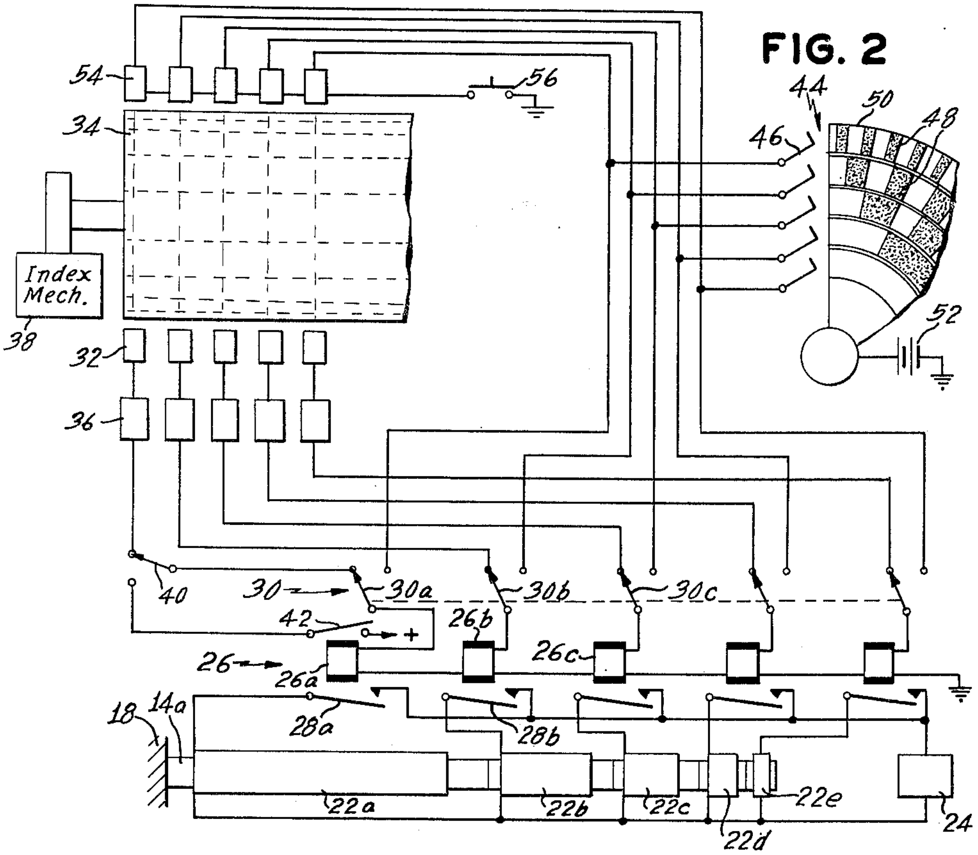
FIGURE 2 is the wiring diagram of the control apparatus for one of two like portions of the micromanipulator of FIG. 1.

FIG. 2 is the wiring diagram for controlling the excitation of a column 14 of elements. In discussing control, these will be understood to be magnetostrictive cores which are presently preferred and which have certain specific advantages. Cores 14*a*, 14*b*, etc. in FIG. 2 have coils 22*a*, 22*b*, etc. These are selectively energized by current from a constant-voltage source 24, held constant at any given time but adjustable to various standardized levels where this proves necessary or desirable. Relays 26*a*, 26*b*, etc. (which are also referred to collectively as relays 26) have contacts 28*a*, 28*b*, etc., for this purpose. The dimensional change of column 14 is dependent on which contacts 28 are closed and which remain open.

A series of switches 30*a*, 30*b*, 30*c*, etc., collectively called switches 30, provide for coordinated control of excitation of cores 14, either under manual control or under program control. With the switches in the positions illustrated, relays 26 are controlled by sensing heads 32 and program drum 34, the response of sensing heads 32 being derived in units 36 that provide amplification and rectification where required. Drum 34 is a progressively indexed magnetic "memory" in this example, although other control apparatus may be substituted as preferred, such as perforated tape used with electrical sensing contacts, etc. Drum 34 has longitudinal control "slots," being the magnetizeable areas opposite sensing heads 32. Opposite each head 32 there is a circular series of control spots, or a "track" of magnetizeable areas that are successively disposed opposite each head when the drum is advanced stepwise by indexing means 38. Means is provided (as discussed below) for recording patterns of magnetized spots in each "slot." Heads 32 are of a form suitable for sensing magnetic fields at rest as, for example, in my Patent Nos. 2,590,091, 2,988,237, 2,926,844.

The operation of the foregoing apparatus may now be described. With drum 34 in any one position, heads 32 sense the opposed "slot" which may consist of magnetized and unmagnetized spots, or of magnetized spots having one polarity or the opposite polarity, depending on whether magnetic-field-sensitive or polarity-sensitive sensing heads are used. Relays 26 cause coils 22 to be energized in dependence on which of the heads 32 are opposite the controlling magnetized spots in the "slot." The total length of column 14 depends on the combination of the coils that are energized. Drum 34 also has slot positions, and additional heads 32 are correspondingly provided, for concurrently controlling column 20 of dimensionally changeable elements. By successively indexing drum 34 to dispose successive slots in sensing position opposite heads 32, a predetermined programmed sequence of precisely determined positions of table 12 can be established.

During the time that drum 34 is in transit from one "slot" to the next, the relays 26 might become denergized if they are fast-acting and if units 36 have no short "holding" characteristic. In that event, column 14 would assume the deenergized extreme limit of its length during drum indexing motions. With the next slot in control position, the various elements 14 are selectively energized by the new combination of control magnetic spots, and the column-length assumes the next programmed position. If the return to the deenergized end limit is objectionable, a "hold" circuit may be added for each relay 26, electronically switched instantaneously into effect before each indexing operation and switched back into control by units 36 in an instantaneous change when the new "slot" has been advanced into position to provide control. Such a circuit is illustrated for unit 22*a*. Switch 40 represents an electronic switch that changes instantly from one position to the other, and reversely when so controlled, so as to connect the winding of relay 26*a* either to unit 36 (as shown) or to holding contacts 42 of relay 26*a*. Just before indexing the drum, switch 40 is shifted to its holding position. If relay 26*a* was energized, it would remain energized through its contacts 42. If head 32 did not cause relay 26*a* to be energized, shifting switch 40 to its holding position would not change the condition of relay 26*a* since contacts 42 would then be open. Subsequently, when the next drum slot is opposite head 32, and switch 40 is shifted back to the position shown, relay 26*a* assumes the condition dictated by the state of the spot on drum 34 that is opposite the corresponding head 32. The result of adding "switch" 40 and holding contacts 42 is to prevent element 22*a* from becoming deenergized during indexing of the drum from one control slot to the next. Therefore, when element 14*a* should be in its stressed condition under control by two successive slots, it will remain stressed during indexing of the drum. This feature avoids return of element 14*a* to its unstressed condition; and where all the elements 14 are so controlled, this feature prevents return of the whole column 14 to its unstressed length when drum 34 is being indexed. As a result, column 14 moves directly from each programmed position to the next.

Depending on the standardized voltage of supply 24, various field intensities may be established in cores 14. If it be assumed that cores 14 are of nickel, the effect of the field is to cause core contraction. For a low excitation level, the total extent of contraction is small; and for higher supply voltages, a greater range is realized. By adjusting the voltage of supply 24 to different levels, it is apparent that the programmed motions of table 10 can be modified proportionally. This feature may be useful, for example, in scribing gratings with different line spacings. Programmed steps at a low voltage would yield close-spaced scribed lines, whereas the same programmed steps at higher voltage would yield a wider spacing of scribed lines, it being assumed that the table is shifted, bearing the part to be scribed, into various positions relative to the fixed stroke-path of the scriber.

In the case of nickel cores, a "saturation" current level is reached, after which any higher field excitation does not modify the magnetostrictive response. This property is particularly valuable where definite strokes are to be programmed without concern for precise control of supply 24 which must then be adequate but need not be held accurately constant.

Relays 26 and elements 14 may be shifted from program control as described to manual control, by shifting switches 30 out of the positions illustrated to their opposite positions, respectively. When this is done, relays 26 and cores 14 are then subject to control by a position encoder 44, including contacts 46 and conductive segments 48 (shaded) on disc 50. Segments 48 are connected to supply 52, which has a ground return connection to the relays. Depending on the setting of disc 50, various contact combinations may be selected for progressively changing the length of column 14. Contact segments 48 are arranged in normally progressing binary-code fashion, and the shortest contacts 48 (in angular extent) correspond to the shortest cores 14. In this way, the gradual change of position of encoder 44 causes corresponding constriction of column 14, from its normal length to its limit of contraction when all coils 22 are energized.

Encoder 44 may be adjusted to various positions in succession, under manual control and under monitored conditions so that the movements of table 10 can be controlled. Each desired position of adjustment in the sequence can be recorded by recording heads 54. It is here assumed that the previous pattern of magnetized spots has been erased by conventional means, in a preparatory operation. When each desired position of table 10 has been set under control of encoder 44, push button 56 is depressed, for connecting recording heads 54 to supply 52 via the selecting contacts 48 then in position. After each desired position of table 10 has been set under control of encoder 44 and the proper combination of recording heads 54 have been energized, the drum is indexed to set the next recording slot of the drum opposite heads 54, in readiness for the next control recording in the program.

Return of switch 30 to the position shown places the drum in control of the magnetostrictive column, as described above.

Figure 5:
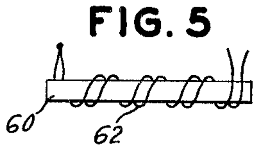
FIGURE 5 is a diagrammatic representation of a typical temperature-compensating component useful in the embodiment of FIG. 3.

It has been assumed that the only dimensional changes in column 14 that occur are due to the control fields imposed by coils 26. Constant temperature is important, to avoid normally greater thermal dimensional changes. Further, coolant at stabilized temperature may be used inside coils 26 to prevent heating of the coils due to the exciting current from affecting the core dimensions. For the purpose of minimizing or wholly avoiding this problem, a compensating column 60 of the same material as cores 14 is provided. The end of column 60 nearest the work table under tool 12 is fixed in position. The remote end of column 60 is fixed to reference stop 18′ which is fixed, in turn, to the end of column 14 remote from tool 12. Ambient temperature changes in column 14 cause thermally induced dimensional changes, and these are compensated by equal changes in column 60. To the extent that exciting current in coils on elements 14*a* adds local heat that could affect cores 14, cores 60 can have concurrently energized windings, producing the same heating effect, the latter being connected in series with or in parallel with corresponding coils 22. A core element 60 is shown in FIG. 5 with a bifilar winding 62 proportioned to have the same heating effect on its core as each winding 22 has on its core 14, but winding 62 is non-inductive and has no magnetizing field, and therefore does not produce a magnetostrictive effect in core 60.

Figure 4:
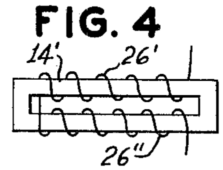
FIGURE 4 is a diagrammatic illustration of a typical magnetostrictive component useful as a modification of the corresponding components in FIGS. 1–3.

It has been assumed above that coils 22 are spaced apart, and that there is no significant endwise field that would extend from each core 14 to the next in the column. If there should be any difficulty due to endwise fringing fields, cores 12 may have inactive spacers interposed between them, or cores 14′ may be split (FIG. 4) and provided with winding portions 22′ and 22″, having oppositely polarized endwise fringing fields. These would be substantially self-canceling, insofar as any effect on the adjoining cores in the column is concerned.

Figure 6:
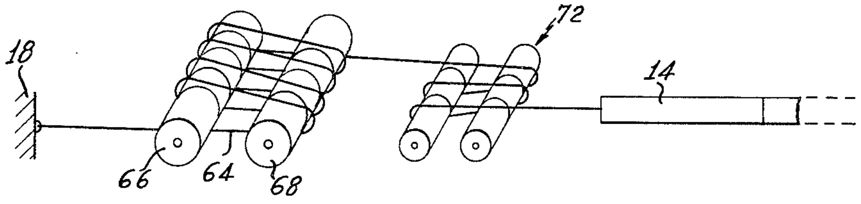
FIGURE 6 is a diagrammatic perspective view of a further modification of part of the micromanipulator in FIGS. 1–3.
Figure 7:
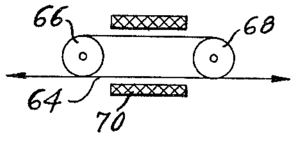
FIGURE 7 is a lateral view, partly in cross-section, of a component part of FIG. 6.

It has been assumed that extremely small but accurately controllable and accurately reproduceable motions are desired. Larger motions can be produced as desired by means of magnetostrictive effects, and these can be added to the column of cores 14. For example, a magnetostrictive core 64 (FIG. 6) may assume the shape of a wire that may be looped repeatedly about two sets of fixedly spaced pulleys 66 and 68. A coil 70 (FIG. 7) is arranged about core loops 64, producing a multiplying effect of displacement versus size of the unit, in proportion to the number of lengths of core exposed to the exciting field of coil 70. Additional looped core or "capstan" units may be added in series, mechanically, unit 72 for example; and these may be added to cores 14 as previously described.

Figure 8:
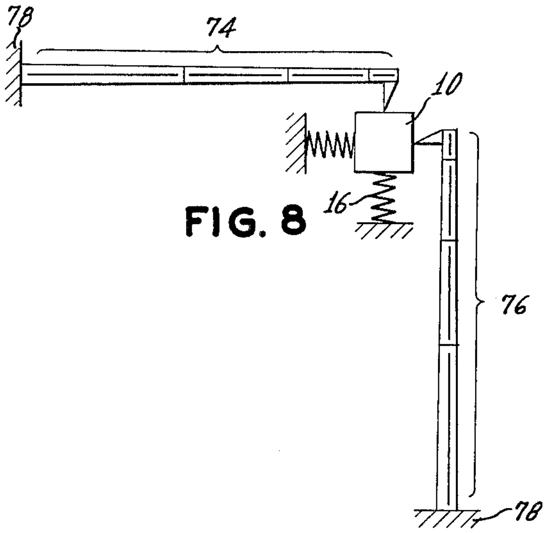
FIGURE 8 is a plan view comparable to FIG. 1, of modified form of micromanipulator adapted to effect greater displacements than that of FIG. 1.
Figure 9:
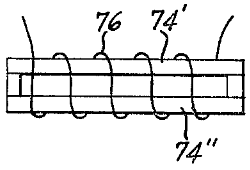
FIGURE 9 is a diagrammatic view of an active component part of FIG. 8.

A further modification of magnetostrictive micromanipulator is shown in FIG. 8. Core elements 74 and core elements 76 are joined rigidly end-to-end as columns, and the column joined rigidly to respective fixed reference points 78. Each element 74 may be formed of core materials that are unequally magnetostrictive, or that are oppositely magnetostrictive or where only one is magnetostrictive and the other inert as to magnetic effects. Thus, in FIG. 9, core 74′ and core 74″ are oppositely magnetostrictive, one contracting and the other becoming elongated in response to a controlled level of excitation. One coil 76 surrounds both cores (in the form here shown) and subjects them to a control magnetic field. The winding arrangement of FIG. 3 may also be used. The result is lateral deflection, somewhat in the manner of thermal bimetallic deflection. Cores 74 are proportioned to impart successively doubled extents of deflection, and are controllable exactly as shown in FIG. 2. Temperature control is naturally important, and compensation may be effected through the use of a dual column of cores of like construction and with non-inductive windings thereon, in the manner described in connection with FIGS. 3 and 5.

Figure 10:
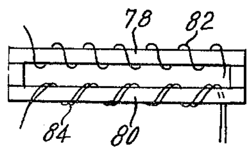
FIGURE 10 is a modification of the component in FIG. 9.

A modified core structure for the apparatus of FIG. 8 appears in FIG. 10. Two cores 78 and 80 of the same magnetostrictive material are fixed together at their ends, one has an inductive winding 82 thereon that has an inherent heating effect on its core when exciting current flows. The other core 80 has a non-inductive winding 84 thereon proportioned to have the same heating effect as coil 82 has on core 78. By connecting coils 82 and 84 in series or in parallel (where they are alike in resistance) core 80 and coil 84 will provide thermal compensation for ambient and excitation temperature effects in core 78. Core 78 will change in length when subjected to a field and consequently one end of the unit in FIG. 10 will deflect relative to the other in response to coil excitation.

Column 76 (which is vertical in the drawing) produces horizontal shift of table 10 and column 74 produces motions of table 10 at right angles, up and down in the drawing. Springs 16 maintain cooperation between the table and the actuating columns.

Figure 3:
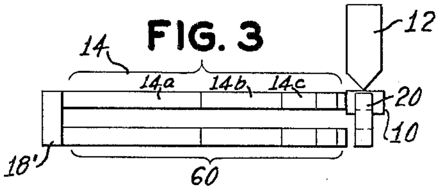
FIGURE 3 is a front elevation of a modification of the embodiment in FIG. 1.

It will be appreciated that the embodiments in FIGS. 1, 3 and 8 involving motions in two directions at right angles to each other may be modified by converting the motions of the table or other work element into polar coordinates, if desired, and additional motions may be added where desired such as a vertical motion of tool 12 relative to the table or of the table relative to the tool.

It is apparent that further modifications and varied application of the features above may be made by those skilled in the art, and it is therefore appropriate that the invention should be broadly construed in accordance with its full spirit and scope.

What is claimed is:

1. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, and selective means for energizing said coils in any desired combinations.

2. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, and selective means including a manually operable position encoder having a sequence of combinational controls effective in sequence to produce progressive incremental displacement of the mechanically displaceable element.

3. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, and selective means including a recorded program of control-combination bits and sensing means therefor for energizing said coils in any desired combinations.

4. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, and selective means for energizing said coils in any desired combinations, the last-named means including a manually operable position encoder, a programmed controller having a sequence of control-combination bits and sensing means therefor, and selective means for alternatively subjecting said coils to control by said position encoder or by said sensing means, said programmed controller also having recording means connected to said position encoder for selective entry into the programmed controller of codes corresponding to a sequence of positions assumed by said mechanically displaceable element under manual control by said position controller.

5. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, and selective means for energizing said coils in any desired combinations, said energizing means and said coils being proportioned to subject said cores to substantially equal flux density, and control means for correspondingly changing the current in all of the selectively energized coils.

6. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, and selective means for energizing said coils in any desired combinations, said energizing means and said coils being proportioned to saturate the cores of the selectively energized coils.

7. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, selective means for energizing said coils in any desired combinations, and an elongated temperature compensating column of the same material as said parts extending parallel to and coextensive with said column of parts, said compensating column having a fixed end at said mechanically displaceable end and the opposite end of said member being secured to said opposite end of the first-mentioned column to serve as the reference point therefor.

8. A micromanipulator, including a mechanically displaceable element, a column of parts in successive contact with each other, said parts including a series of magnetostrictive cores, one end of the column being fixed to said element and the opposite end being fixed to a reference point, said cores being of progressively different lengths and being disposed lengthwise in the column, respective coils on said cores, each of said cores including a closed loop of magnetostrictive material having elongated parallel sides, each said coil including two portions on said sides, respectively, and connected and wound in the sense to produce oppositely polarized, mutually canceling endwise fringing fields.

9. A micromanipulator, including a series of interconnected parts serially in sustained contact with each other and including components each being of a material susceptible of dimensional change in response to an imposed field, said components being proportioned relative to each other to produce a progression of successively doubled displacements in response to predetermined fields, means securing one end of said series of components to a reference means, the end of said series of components having a work element thereon, and selective means for imposing standardized dimension-changing fields on any desired combination of said components.

10. A micromanipulator in accordance with claim 9, wherein at least certain of said components are magnetostrictive cores and wherein said field-imposing means includes a coil for each said core and means for passing a standardized current therethrough whenever such core is selected for dimensional change.

11. A micromanipulator in accordance with claim 9, wherein at least certain of said components are paired elongated cores secured together at the extremities thereof, at least one of said cores being of magnetostrictive material, and means including a magnetizing coil and a standardized current source for effecting a magnetostrictive dimensional change in said one of said paired cores in relation to the other, whereby to cause lateral deflection of the paired cores at one end thereof relative to the other end thereof.

12. A micromanipulator in accordance with claim 11, wherein said paired cores are of oppositely magnetostrictive materials and wherein each said core has a field-imposing coil thereon.

13. A micromanipulator in accordance with claim 11, wherein both said paired cores are of the same magnetostrictive material and wherein only one said core element has a magnetizing coil thereon that inherently heats its core when energized, the other of said cores having a non-magnetizing electric heating element thereon connected for concurrent energization with said magnetizing coil and proportioned to develop compensating heat in said other core.

14. A magnetostrictive device including first and second elongated cores joined together at their extremities, a magnetizing coil about one of the cores having an inherent heating effect, and a non-magnetizing winding on the other core of proportions simulating said magnetizing coil, and means for energizing said coils equally and thereby deflecting the joined ends of the cores at one end relative to the other by magnetostrictive effects to the exclusion of incidental thermal effects.

15. A magnetostrictive device including an elongated core, a pair of mechanically stable devices about which said elongated core is tightly looped in alternation repeatedly, and a magnetizing winding about multiple loops of said core.

16. A micromanipulator in accordance with claim 9, wherein said selective means includes a recorded program of combinational control indicia, wherein means is provided for changing from one set of combinational control indicia to the next, and wherein holding means is provided and is operable for maintaining selective field excitation according to one set of combinational control indicia and until the next set of combinational control indicia are in control position.

17. A micromanipulator including a mechanically displaceable element, a dimensionally changeable two-ended actuator having one end fixed to said displaceable element and including a field-responsive first component and electrical means for imposing a field thereon, said component being inherently subject to thermal dimensional change incidental to operation of said field imposing means, a dimensionally changeable two-ended compensator having a first end thereof fixed to the end of said two-ended actuator remote from said one end and said two-ended compensator having a second end remote from said first end fixed to a reference point adjacent to said displaceable element, said compensator including a compensating component subject to thermal dimensional changes, electrically excitable field-nullified means associated with said compensating component for simulating in said compensating component the heating effect of said field imposing means on said first component, and common means for energizing said electrical field imposing means and said field-nullified means concurrently.

References Cited by the Examiner

UNITED STATES PATENTS

| | | | |
|---|---|---|---|
| 2,077,962 | 4/1936 | Smith. | |
| 2,433,337 | 12/1947 | Bozroth. | |
| 2,550,771 | 5/1951 | Camp | 310—26 |
| 2,760,168 | 8/1956 | Doelz | 310—26 |
| 2,887,294 | 5/1959 | Hahn | 310—26 X |
| 2,930,911 | 3/1960 | Halliday | 310—26 |
| 2,949,900 | 8/1960 | Bodine. | |
| 3,051,916 | 8/1962 | Rothbart | 310—26 X |
| 3,109,973 | 11/1963 | Harris | 310—26 X |
| 3,138,749 | 6/1964 | Stibitz | 310—26 |

GERALD M. FORLENZA, *Primary Examiner.*

HUGO O. SCHULZ, *Examiner.*